United States Patent
Moulin et al.

(10) Patent No.: US 8,927,864 B2
(45) Date of Patent: Jan. 6, 2015

(54) ELECTRICAL APPLIANCE WITH LEAKTIGHT CONNECTIONS, AND A METHOD OF FABRICATION

(75) Inventors: David Moulin, Montrouge (FR); Roger Lhostis, Douains (FR); Bruno Tellier, Saint Julien de la Liegue (FR)

(73) Assignee: SKF Magnetic Mechatronics, Saint Marcel (FR)

( * ) Notice: Subject to any disclaimer, the term of this patent is extended or adjusted under 35 U.S.C. 154(b) by 567 days.

(21) Appl. No.: 13/188,702

(22) Filed: Jul. 22, 2011

(65) Prior Publication Data
US 2012/0067640 A1  Mar. 22, 2012

(30) Foreign Application Priority Data
Jul. 23, 2010  (FR) ...................................... 10 56072

(51) Int. Cl.
*H01R 4/72* (2006.01)
*H01R 13/53* (2006.01)
*F16C 32/04* (2006.01)
*H01B 3/42* (2006.01)
*H01B 3/44* (2006.01)

(52) U.S. Cl.
CPC ............... *F16C 32/04* (2013.01); *H01B 3/427* (2013.01); *H01B 3/445* (2013.01); *F16C 2202/30* (2013.01)
USPC ........................................ 174/84 R; 439/523

(58) Field of Classification Search
USPC ........................................ 174/84 R; 439/523
See application file for complete search history.

(56) References Cited

U.S. PATENT DOCUMENTS

| | | | | |
|---|---|---|---|---|
| 3,451,609 A | * | 6/1969 | Gillett ......................... | 228/56.3 |
| 3,582,457 A | * | 6/1971 | Barthell ....................... | 138/140 |
| 3,777,048 A | * | 12/1973 | Traut ........................... | 174/73.1 |
| 4,801,501 A | * | 1/1989 | Harlow ........................ | 428/383 |
| 5,537,742 A | * | 7/1996 | Le et al. ........................ | 29/869 |
| 6,454,598 B1 | * | 9/2002 | Burwell et al. .............. | 439/523 |
| 7,494,289 B1 | * | 2/2009 | Chen ............................ | 385/99 |
| 7,679,242 B2 | * | 3/2010 | Parmeter et al. ............. | 310/87 |
| 8,540,295 B2 | * | 9/2013 | Babinchak ................... | 294/74 |
| 2007/0214638 A1 | * | 9/2007 | Shadel et al. ................ | 29/854 |
| 2008/0248226 A1 | * | 10/2008 | Simon et al. ................ | 428/34.9 |
| 2009/0169790 A1 | * | 7/2009 | Nadeau et al. ............. | 428/36.91 |
| 2012/0090765 A1 | * | 4/2012 | Tailor et al. .................. | 156/86 |
| 2012/0321906 A1 | * | 12/2012 | McCrea et al. .............. | 428/613 |

FOREIGN PATENT DOCUMENTS

| | | | |
|---|---|---|---|
| EP | 0671746 | 9/1995 | |
| GB | 2 226 691 | 7/1990 | |
| JP | 4334946 | 11/1992 | |
| JP | 10329216 A | * 12/1998 | ............. B29C 63/42 |

* cited by examiner

Primary Examiner — Jeremy C Norris
Assistant Examiner — Nathan Milakovich
(74) Attorney, Agent, or Firm — Preti Flaherty Beliveau & Pachios LLP

(57) ABSTRACT

An electrical connection is provided for an environment that is subjected to corrosive gases or liquids. An outer insulating layer is formed on each of at least two conductors and made up of a fluorinated polymer that is meltable at a temperature situated between the temperature of the environment and a predetermined higher temperature. A heat-shrink sleeve surrounds the conductors and is made up of an outer layer of heat-shrink polymer and an inner layer of the fluorinated polymer that is meltable at a temperature situated between the temperature of the environment and the predetermined higher temperature. A weld is formed by melting the outer insulating layers of the conductors and the inner layer of the heat-shrink sleeve by heating to a temperature higher than the temperature of the environment and lower than the predetermined higher temperature, thereby making a weld that is continuous and leaktight, and of controlled thickness.

25 Claims, 1 Drawing Sheet

ELECTRICAL APPLIANCE WITH LEAKTIGHT CONNECTIONS, AND A METHOD OF FABRICATION

FIELD OF THE INVENTION

The present invention relates to the field of magnetic bearings for rotary machines, and it relates more particularly to a method of making leaktight electrical connections for such machines.

PRIOR ART

Magnetic bearings are used in industry to enable a rotor of a rotary machine to rotate without contact. A magnetic bearing may be used directly in environments for processing/extracting gas that is pressurized, corrosive, and hot. For its stator portions, the bearing is made of bundles of magnetic laminations having electric coils placed thereon that are used to create the magnetic field needed to levitate the rotor. A machine of this type is well known and one such machine is described for example in patent EP 1 395 759 filed in the name of the Applicant. Since the assembly may be arranged in a stream of corrosive gas, which potentially conducts electricity, it is necessary to protect the copper conductors of the electric coils from the environment, and also to isolate the copper wires from one another and relative to ground.

Making the insulation of copper wires compatible with the environment is a problem that occurs frequently in industrial applications, in particular in gas fields where the composition of the gas can vary over time and is not fully under control. Furthermore, adding a process fluid, for example mono ethylene glycol, may degrade the quality of the insulation and give rise to the entire rotary machine breaking down. In addition, connections between coils are needed in order to make the overall electrical circuit, however such connections represent weak points in terms of electrical insulation since they are under pressure and might be grounded by fluid reaching the copper conductor. This grounding needs to be avoided at all costs since it gives rise to a complete system breakdown, possibly with the rotor landing.

The present solution to the problem of insulating electrical connections consists in using a copper conductor that is insulated by various tapes and non-leakproof layers that are impregnated with an electrically insulating resin, typically an epoxy resin. The purpose of the resin is to reinforce the electrical insulation of the wires relative to one another, to protect the copper conductors chemically from the corrosive gas, and also to fill the voids between the conductors so as to avoid any risk of possible explosive depressurization, and to hold the electrical coils together mechanically by adhesion so as to ensure that they are gastight.

Given the wide variety of chemical atmospheres, pressures, and temperatures that are to be encountered in industrial applications, it is very difficult to find an impregnation resin that can withstand all varieties. Furthermore, because of the difficulty of identifying all of the phenomena whereby known electrical resins are degraded and because of their interactions with elements of the gas, validating chemical protection requires a large amount of testing that is expensive to implement on installations that, in practice, are relatively uncommon.

The step of impregnating the coils is thus a solution that is burdensome to implement in terms of working since it is a method that consumes an enormous amount of time and other means, both human and in terms of materials. Furthermore, the toxicity of electrical impregnation resins requires large amounts of protection for individuals and also time-consuming management of the chemical substances used.

There therefore exists at present a considerable need for improved insulation of electrical connections from between such coils and the exit from the gas environment outside of the rotary machine in order to improve the reliability of magnetic bearings and of their detectors in gas processing environments.

OBJECT AND SUMMARY OF THE INVENTION

An object of the present invention is thus to reinforce the chemical protection of connections and to make them leaktight by a radical change of the concept on which the insulation is based, in particular by replacing the conventional principle of protecting conductor wires by means of an impregnation resin with an insulation system that is extruded directly onto each conductor wire, that is leaktight, and that is continuous as far as the exit from the machine.

This object is achieved by an electrical connection for achieving leaktight electrical linking in an environment that is subjected to corrosive gases or liquids, wherein the connection comprises:
  at least two conductors for forming said electrical connection between each other or with a connector element;
  an outer insulating layer formed on each of said conductors and made up of a fluorinated polymer that is meltable at a temperature situated between the temperature of said environment and a predetermined higher temperature;
  a heat-shrink sleeve surrounding said conductors and made up of an outer layer of heat-shrink polymer and an inner layer of said fluorinated polymer that is meltable at a temperature situated between the temperature of said environment and said predetermined higher temperature;
  melting said outer insulating layers of said conductors and said inner layer of said heat-shrink sleeve by heating to a temperature higher than said temperature of said environment and lower than said predetermined higher temperature, thereby making a weld that is continuous and leaktight, and of controlled thickness.

In an envisaged embodiment, said outer insulating layers of said conductors and said inner layer of said heat-shrink sleeve are made of fluorinated ethylene propylene (FEP) or said outer insulating layers of said conductors are made of perfluoroalkoxy copolymer (PFA).

Advantageously, said inner layer of said heat-shrink sleeve may be of thickness that varies and is adapted to the zones for filling around said element for connection in order to obtain a weld that is continuous and completely leaktight.

Preferably, said electrical connection further includes an inner insulating layer on each of said conductors that withstands temperatures higher than said predetermined higher temperature.

In an envisaged embodiment, said inner insulating layers of said conductors are made of polyetheretherketone (PEEK) or said inner insulating layers of said conductors and said outer layer of said heat-shrink sleeve are made of polytetrafluoroethylene (PTFE).

Advantageously, said temperature of said environment is no greater than 200° C. and said predetermined temperature is not less than 300° C.

Said element to be connected may be a temperature probe that is thus sealed relative to its environment, and one of said conductors may be a contact of a leaktight bushing.

Preferably, said conductors are used as heater elements during said melting.

By way of example, the electrical connection of the invention may be used in any of the following devices: an electric motor, a magnetic bearing, a magnetic bearing position sensor, a magnetic bearing speed sensor.

BRIEF DESCRIPTION OF THE DRAWING

The characteristics and advantages of the present invention appear better from the following description made by way of non-limiting indication and with reference to the accompanying drawing, in which.

DETAILED DESCRIPTION OF A PREFERRED EMBODIMENT

Figure 1A:
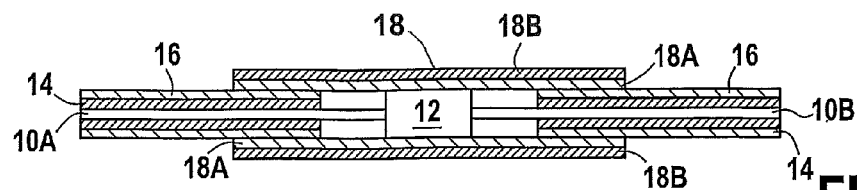
FIGS. 1A and 1B show the principle of making a leaktight connection of the invention.
Figure 1B:
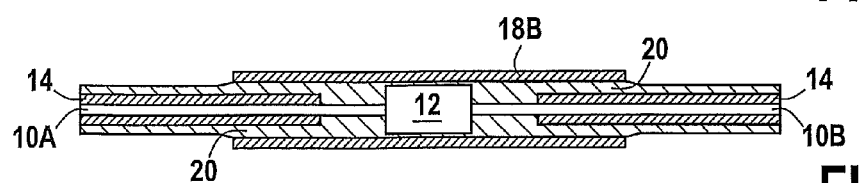

In the invention, and as shown in the diagrams of FIGS. 1A and 1B, the insulation of the conductor wires and/or cables 10A, 10B of a connection 12 no longer relies on adding an electrical impregnation resin, but rather on an insulation structure comprising, going from the conductor wire outwards:

an insulation layer 14 made of a chemically resistant polymer that is extruded onto the conductor wire, typically a polytetrafluoroethylene (PTFE) or a polyetheretherketone (PEEK), that does not present a melting temperature, or that has a melting temperature very well above 300° C.; and an insulating layer 16 formed by a meltable fluorinated polymer, typically a fluorinated ethylene propylene (FEP) or a perfluoroalkoxy copolymer (PFA) having a melting temperature that is higher than the temperature to which the conductor wire is subjected (the application temperature), typically 200° C. maximum, but very well below the melting temperature of the above insulating layer.

The first insulating layer 14 referred to in the description below as the "inner" insulation is an optional layer, whereas the second insulating layer 16 that is referred to below as the "outer" insulation is always present. Whether or not the first insulating layer is present, the second insulating layer is always extruded onto said first layer or else directly onto the conductor wire. In contrast, the first insulating layer may be extruded or it may merely be deposited by some other method, in particular for cables of large diameter.

This type of insulation presents the advantage of presenting very good chemical stability in a very large number of environments that are encountered in industrial applications that include magnetic bearings. This chemical inertness relative to a variety of environments makes it possible to guarantee that the coils of the bearings are insulated from ground, with this being applicable up to temperatures as high as 200° C.

The use of a meltable fluorinated polymer as the outer insulating layer for the conductor wire 10A, 10B makes it possible to achieve leaktight connections between the conductor wires by melting the outer layer 16 together with a similar layer 18A of a linking sleeve 18 that covers the connection and the ends of the conductor wires to which it is connected. To do this, the linking sleeve has an outer layer of heat-shrink polymer 18B serving to apply pressure to the two meltable layers and thus making a weld 20 that is continuous (filling in the zones around the connection that do not include meltable insulation) and completely gastight and liquid-tight, thereby limiting the weak points constituted by electrical connections. The two layers are melted by heating to a temperature higher than the melting temperature of the layer of meltable insulation, it being possible to use the conductor wire as a heater element. Advantageously, melting may be performed in a vacuum so as to avoid imprisoning any bubbles or pockets of air in the connection which could, following an explosion in a pressurized medium, give rise to an explosive depressurization.

The non-meltable inner insulating layer is optional and may be necessary to guarantee continuity of insulation in the event of the outer insulating layer being subject to creep when hot. That is why its melting temperature, if it has one, must be greater than the melting temperature of the outer insulating layer.

Figure 2A:
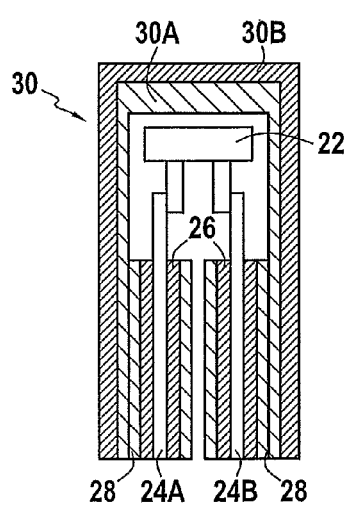
FIGS. 2A and 2B show a first embodiment of the leaktight connection applied to a temperature probe.
Figure 2B:
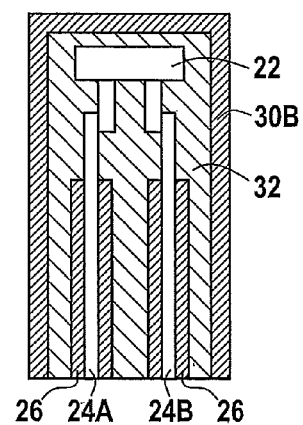

This leaktight linking principle of welding together two layers of meltable insulation may be generalized without any particular difficulty to other connections of the machine, in particular to connections for temperature probes, where said connections also constitute weak points in machines that operate in corrosive gas, or gas that is potentially wet. Thus, as shown in FIGS. 2A and 2B, a temperature probe 22 is connected by two conductors 24A, 24B to measurement electronics (not shown). Each conductor has first and second layers of insulation 26, 28, and the probe is surrounded by a linking sleeve 30 comprising an inner layer of meltable insulation 30A and an outer layer of heat-shrink polymer 30B. The thickness of the inner layer 30A of insulation may vary and may be adapted to the zone that needs to be filled around the temperature probe so that after heating, a meltable weld 32 is obtained that is continuous and perfectly leaktight.

Figure 3:
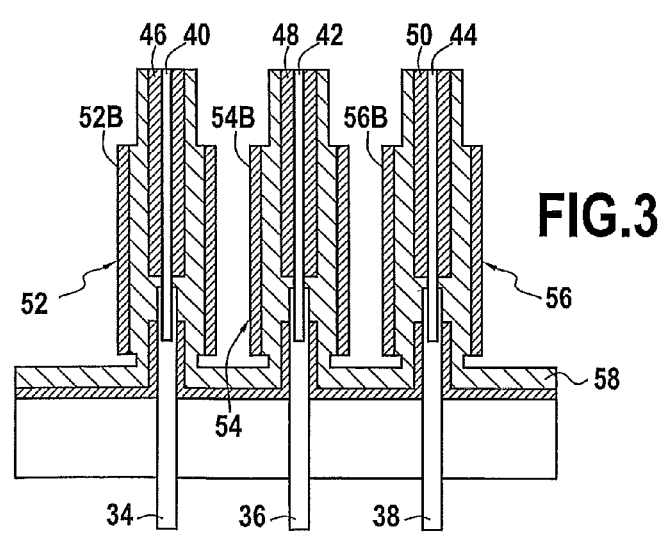
FIG. 3 shows a second embodiment of the leaktight connection applied to passing electric cables.

It is also clear that this leaktight linking principle may also be applied to connecting leaktight bushings that enable signals and/or power to pass in and out of a pressurized medium that exists in a machine that is subjected to such a medium. By using a layer of meltable insulation in contact with the leaktight bushing, insulation losses due to fluid infiltrating as far as the contacts are limited. Thus, as shown in FIG. 3, signals delivered on three contacts of a leaktight bushing 34, 36, 38 are connected directly to three conductors 40, 42, and 44. Each conductor is covered in a respective first layer of insulation 46, 48, 50, a respective second layer of insulation, and it is surrounded by a respective linking sleeve 52, 54, 56 that comprises an outer layer of heat-shrink polymer 52B, 54B, 56B and an inner layer of meltable insulation that serves, after heating, to form a meltable weld 58 that is continuous and perfectly leaktight, together with the outer insulating layer covering the contacts of the leaktight bushing.

Thus, in the invention, the use of a conductor wire covered in a layer of meltable insulation in association with a layer of the same type makes it possible to omit the impregnation operation, which requires time, manpower, and management of chemical substances, while also providing better protection against aggressive environments.

What is claimed is:

1. An electrical connection for achieving leaktight electrical linking in an environment that is subjected to corrosive gases or liquids, wherein the connection comprises:

two conductors for forming said electrical connection between each other;

an outer insulating layer formed on each of said conductors and made up of a fluorinated polymer that is meltable at a temperature situated between the temperature of said environment and a predetermined higher temperature;

a heat-shrink sleeve surrounding said conductors and made up of an outer layer of heat-shrink polymer and an inner layer of said fluorinated polymer that is meltable at a temperature situated between the temperature of said environment and said predetermined higher temperature;

a weld formed by the melting of said outer insulating layers of said conductors and said inner layer of said heat-shrink sleeve by heating to a temperature higher than said temperature of said environment and lower than said predetermined higher temperature, thereby making said weld continuous and leaktight, and of controlled thickness; and wherein said inner layer of said heat-shrink sleeve is of a thickness that varies from heating and is adapted to zones for filling around an element for connection of said conductors in order to obtain a weld that is continuous and completely leaktight.

2. An electrical connection according to claim 1, wherein said outer insulating layers of said conductors and said inner layer of said heat-shrink sleeve are made of fluorinated ethylene propylene (FEP).

3. An electrical connection according to claim 1, wherein said outer insulating layers of said conductors are made of perfluoroalkoxy copolymer (PFA).

4. An electrical connection according to claim 1, further including an inner insulating layer on each of said conductors that withstands temperatures higher than said predetermined higher temperature.

5. An electrical connection according to claim 4, wherein said inner insulating layers of said conductors are made of polyetheretherketone (PEEK).

6. An electrical connection according to claim 4, wherein said inner insulating layers of said conductors and said outer layer of said heat-shrink sleeve are made of polytetrafluoroethylene (PTFE).

7. An electrical connection according to claim 1, wherein said temperature of said environment is no greater than 200° C.

8. An electrical connection according to claim 1, wherein said predetermined temperature is not less than 300° C.

9. An electrical connection according to claim 1, wherein said element to be connected is a temperature probe that is thus sealed relative to its environment.

10. An electrical connection according to claim 1, wherein one of said conductors is a contact of a leaktight bushing.

11. An electrical connection according to claim 1, wherein said conductors are used as heater elements during said melting.

12. The electrical connection according to claim 1 as a component in one or more of an electric motor, a magnetic bearing, a magnetic bearing position sensor, a magnetic bearing speed sensor.

13. An electrical connection for achieving leaktight electrical linking in an environment that is subjected to corrosive gases or liquids, wherein the connection comprises:

at least two conductors for forming said electrical connection with a connector element;

an outer insulating layer formed on each of said conductors and made up of a fluorinated polymer that is meltable at a temperature situated between the temperature of said environment and a predetermined higher temperature;

a heat-shrink sleeve surrounding said conductor element and said conductors and made up of an outer layer of heat-shrink polymer and an inner layer of said fluorinated polymer that is meltable at a temperature situated between the temperature of said environment and said predetermined higher temperature;

a weld formed by the melting of said outer insulating layers of said conductors and said inner layer of said heat-shrink sleeve by heating to a temperature higher than said temperature of said environment and lower than said predetermined higher temperature, thereby making around said connector element said weld continuous and leaktight, and of controlled thickness.

14. An electrical connection according to claim 13, wherein said outer insulating layers of said conductors and said inner layer of said heat-shrink sleeve are made of fluorinated ethylene propylene (FEP).

15. An electrical connection according to claim 13, wherein said outer insulating layers of said conductors are made of perfluoroalkoxy copolymer (PFA).

16. An electrical connection according to claim 13, wherein said inner layer of said heat-shrink sleeve is of a thickness that varies and is adapted to zones for filling around said element for connection in order to obtain a weld that is continuous and completely leaktight.

17. An electrical connection according to claim 13, further including an inner insulating layer on each of said conductors that withstands temperatures higher than said predetermined higher temperature.

18. An electrical connection according to claim 17, wherein said inner insulating layers of said conductors are made of polyetheretherketone (PEEK).

19. An electrical connection according to claim 17, wherein said inner insulating layers of said conductors and said outer layer of said heat-shrink sleeve are made of polytetrafluoroethylene (PTFE).

20. An electrical connection according to claim 13, wherein said temperature of said environment is no greater than 200° C.

21. An electrical connection according to claim 13, wherein said predetermined temperature is not less than 300° C.

22. An electrical connection according to claim 13, wherein said element to be connected is a temperature probe that is thus sealed relative to its environment.

23. An electrical connection according to claim 13, wherein one of said conductors is a contact of a leaktight bushing.

24. An electrical connection according to claim 13, wherein said conductors are used as heater elements during said melting.

25. The electrical connection according to claim 13 as a component in one or more of an electric motor, a magnetic bearing, a magnetic bearing position sensor, a magnetic bearing speed sensor.

* * * * *